Patented Sept. 9, 1952

2,610,158

UNITED STATES PATENT OFFICE 2,610,158

STABILIZATION OF LATEX AND STABILIZED COMPOSITIONS

Alan Montague Hall, Leicester, England, assignor to B. B. Chemical Co., Boston, Mass., a corporation of Massachusetts No Drawing. Application April 11, 1950, Serial No. 155,347. In Great Britain November 23, 1949

7 Claims. (Cl. 260—3)

This invention is concerned with improvements in or relating to latex compositions and particularly to latex compositions stabilized against coagulation by polar solvents and to methods of stabilizing a latex.

It is customary to add ammonia to rubber latex, at the locality where it is obtained, to stabilize the latex against coagulation and deterioration during shipment due, for example, to bacterial action, but where it is desired that rubber latex shall be sufficiently stable to ensure satisfactory handling by mechanical devices (for example by applying rollers or the like) it is generally found desirable to add additional stabilizers to the latex, usually protective colloids, e. g. bentonite, casein or glue; various proprietary stabilizers are also widely used.

Rubber latex stabilized merely by the addition of ammonia is not only liable to coagulate when handled by mechanical devices but also when polar solvents, e. g. ethyl alcohol, acetone or ethyl acetate are added thereto. Thus usually the addition of ethyl alcohol in anything other than small proportions will cause coagulation, either immediately or in a short time, especially where the latex has been concentrated, and it has proved difficult to compound rubber latex, even with additional stabilizers, in such a manner that any substantial proportion of a polar solvent may be added thereto and not bring about coagulation in a short time. In view of the sensitivity of rubber latex to additions of polar solvents the production of a stable composition comprising both rubber latex and a plastic toughening or insolubilizing substance which is soluble, to any substantial extent, only in polar solvents has proved difficult to effect satisfactorily; the substance in question may, for example, be nitrocellulose or a phenol-aldehyde or other synthetic resin which is most satisfactorily emulsified in water in the form of its solution in a polar solvent.

It is a feature of the present invention to provide an improved method of stabilizing rubber latex against coagulation when handled by mechanical devices or when a substantial proportion of a polar solvent, e. g. ethyl alcohol, is added.

It is a further feature of the invention to provide an improved rubber latex composition possessing exceptional stability against coagulation by mechanical handling or addition of polar solvents.

It has been discovered that latices wherein the dispersed phase comprises rubber particles may be stabilized against coagulation by mechanical handling or by addition of polar solvents through association of the individual particles with urea-casein aldehyde products precipitated thereon. These stabilized latices may be improved by addition of a solution or dispersion of a resin or of a cellulose ester or ether comprising an organic solvent. The stabilized latices are not coagulated by solvents present in the resins or cellulose solutions or dispersions even where the solvents are polar solvents. The amount of urea-casein aldehyde product required in the latices to inhibit coagulation of the rubber does not prevent the rubber deposited from the latex from exhibiting its normal adhesive characteristics. Coatings deposited by latices compounded with cellulose derivatives or resins form coatings and impregnated products which are tougher and stronger than those obtained from unmodified latices, and the coatings and impregnations formed by the modified latices may, where a curing type of resin is employed, resist the action of solvents including hot mineral oils and hydrocarbon solvents.

A stabilized latex for compounding with a resin or cellulose derivative solution or dispersion may be prepared by combining casein, urea and the latex and precipitating a condensation product on the individual rubber particles, for example, by addition of an excess of aldehyde.

In my application entitled Methods of Stabilizing Latex and Stabilized Latex Compositions, Serial No. 155,348 filed April 11, 1950, there is described a method of stabilizing a latex wherein urea and casein are heated together in solution to effect a reaction between them and form a solution of the reaction product. This reaction product is added, according to the method of that application to a natural rubber latex and the urea-casein reaction product is precipitated on the rubber particles of the latex, for example by addition of an aldehyde.

In accordance with the present invention latex is stabilized by addition of urea and casein without a preliminary reaction between the urea and casein. In accordance with the procedure in the present invention a stabilized latex may be prepared by adding a solution of casein in water (which may contain borax) to the latex to be stabilized, then adding an aqueous solution of urea and thereafter adding an aqueous solution of formaldehyde. Alternatively, there may be added an aqueous solution of urea to the latex, next a solution of casein in water and finally an aqueous solution of formaldehyde. In a further modification an aqueous solution of urea may be mixed with a solution of casein, the unreacted mixture added to the latex and finally an aqueous solution of formaldehyde added. In each of these methods, the formaldehyde is added after the urea and casein since adding formaldehyde before the casein and urea tends to coagulate the latex.

The latex to which the urea and casein are added may be a natural rubber latex which desirably though not necessarily, has been concentrated in rubber solids, for example, to 60% rubber solids. The latex normally contains a small percentage of ammonia for preservative purposes and is well on the alkaline side. Other alkaline material may be substituted for the ammonia. For example, triethanolamine, monoethanolamine, monoethyl amine, triethyl amine and pyridine are quite satisfactory. Potassium hydroxide, sodium carbonate and borax may also be used. Sufficient alkaline material is added to bring the pH value to 10-11.

The term "natural rubber latex" is employed in the specification and claims in its usual sense of referring to the naturally occurring dispersion of rubber particles in an aqueous medium either in the condition in which it was collected or in concentrated condition and does not include artificial redispersions of crude or reclaimed rubber.

In each of these methods the urea and casein are employed in the ratio of at least one-half part and preferably from two to four parts by weight of casein with one part of urea; and the combined weight of urea and casein totals at least 1½ parts and preferably at least 4½ parts by weight to 100 parts by weight of rubber in the latex. An excess of aldehyde, preferably formaldehyde, over the amount required to react with the ammonia present in the latex is added to precipitate protective material on the rubber particles.

The precipitated condensation product on the dispersed particles of rubber in the latex is uniquely effective in protecting the rubber of the latex against coagulation by polar solvents. It is believed that this effectiveness may be due to a great insolubility or repellency toward polar solvents possessed by the precipitated material. That is, the precipitated material may be in the nature of an insoluble, resinous condensation product of casein, urea and the aldehyde so that it remains effective to protect the rubber of the latex against coagulation even in the presence of polar solvents.

The following examples are given as of possible assistance in understanding the invention and it is to be understood that the invention is not restricted to the details of proportions, specific ingredients or specific procedures disclosed in the examples.

*Example I.*—A 14% casein solution was prepared by soaking 17 gms. of casein for one-half hour in 85 ccs., of water. A borax solution containing 5 ccs. of borax and 15 ccs. of water was then added and the resultant mixture heated to 150° F. to form a clear solution. An aqueous solution of urea was prepared consisting of 1.8 gms. of urea and 9 ccs. of water.

The urea solution and 24.5 gms. of the casein solution were added to 200 gms. of a 60% natural rubber latex. Thereafter, 17 ccs. of a 40% formaldehyde solution were added to the mixture.

The resultant mixture after standing at room temperature for seven days, during which it is believed that certain chemical changes take place, showed stability against coagulation upon mixture with polar solvents. For example, it required the addition of 70 ccs. of denatured alcohol to 50 gms. of the latex before coagulation occurred.

*Example II.*—An aqueous solution of urea comprising 1.8 gms. of urea in 9 ccs. of water were added to 200 gms. of a 60% natural rubber latex and there were then added 24.5 gms. of a 14% casein solution prepared as described in Example I. Thereafter, 17 ccs. of a 40% formaldehyde solution were added. After standing for seven days, the resulting mixture showed a stability very similar to that of the composition of Example I.

*Example III.*—18 gms. of casein were soaked in 80 ccs. of water for one-half hour. 2.5 ccs. of concentrated aqueous ammonia and the resultant mixture were heated to 150° F. to form a clear solution. An aqueous solution of 9 gms. of urea in 20 ccs. of water were then added to the casein solution. 26.5 gms. of the casein-urea solution were added to 200 gms. of a 60% natural rubber latex. 17 ccs. of a 40% formaldehyde solution were diluted with 8 ccs. of water and added to the mixture of latex and casein-urea solution. The resultant mixture after standing at room temperature for seven days had a stability very similar to that of the compositions of Examples I and II.

Having described my invention, what I claim as new and desire to secure by Letters Patent of the United States is:

1. A natural rubber latex composition wherein the individual rubber particles of an alkaline natural rubber latex have precipitated thereon the product of combining in situ at least one-half part by weight of casein and one part by weight of urea with formaldehyde, at least 1½ parts combined weight of casein and urea being associated with 100 parts by weight of rubber solids in said dispersion.

2. A natural latex composition wherein the individual rubber particles of an alkaline natural rubber latex have precipitated thereon the product of combining in situ formaldehyde with from two to four parts by weight of casein and one part by weight of urea, 4½ parts combined weight of casein and urea being associated with 100 parts by weight of rubber solids in said dispersion.

3. The method of treating an alkaline natural rubber latex to form a stable composition which comprises the steps of adding unreacted urea and casein in the ratio of at least one-half part by weight of casein to one part by weight of urea, to said latex in the proportion of at least 1½ parts combined weight of urea and casein to 100 parts by weight of rubber solids, and precipitating said urea and casein on the individual rubber particles by adding formaldehyde to the latex.

4. The method of treating an alkaline natural rubber latex to form a stable composition which comprises the steps of adding separately at least one-half part by weight of casein and one part by weight of urea, to said latex, the combined weight of urea and casein being at least 1½ parts to 100 parts by weight of rubber solids, and precipitating said urea and casein on the individual rubber particles by adding formaldehyde to the latex.

5. The method of treating an alkaline natural rubber latex to form a stable composition which comprises the steps of adding unreacted urea and casein in the ratio of from two to four parts by weight of casein to one part by weight of urea, to said latex in the proportion of at least 4½ parts combined weight of urea and casein to 100 parts of rubber solids and precipitating said urea and casin on the individual rubber particles by adding formaldehyde to the latex.

6. The method of treating an alkaline natural rubber latex to form a stable composition which comprises the steps of adding separately urea and casein in the ratio of from two to four parts by weight of casein to one part by weight of urea, to said latex in the proportion of at least 4½ parts combined weight of urea and casein to 100 parts of rubber solids and precipitating said urea and casein on the individual rubber particles by adding formaldehyde to the latex.

7. The method of treating an alkaline natural rubber latex to form a stable composition which comprises the steps of adding a solution of unreacted urea and casein in the ratio of from two to four parts by weight of casein to one part by weight of urea, to said latex in the proportion of at least 4½ parts combined weight of urea and casein to 100 parts of rubber solids and precipitating said urea and casein on the individual rubber particles by adding formaldehyde to the latex.

ALAN MONTAGUE HALL.

REFERENCES CITED

The following references are of record in the file of this patent:

UNITED STATES PATENTS

| Number | Name | Date |
|---|---|---|
| 1,967,639 | Wedger | July 24, 1934 |
| 1,971,522 | Dunham | Aug. 28, 1934 |
| 2,308,879 | Hirsch | Jan. 19, 1943 |

FOREIGN PATENTS

| Number | Country | Date |
|---|---|---|
| 562,755 | Germany | Oct. 28, 1932 |